United States Patent
Boehme et al.

(10) Patent No.: US 10,811,854 B2
(45) Date of Patent: Oct. 20, 2020

(54) MOUNTING PLATE ASSEMBLY FOR A SWITCHGEAR CABINET

(71) Applicant: RITTAl GMBH & CO. KG, Herborn (DE)

(72) Inventors: Siegfried Boehme, Wolfen (DE); Heiko Holighaus, Eschenburg (DE)

(73) Assignee: RITTAL GMBH & CO. KG (DE)

( * ) Notice: Subject to any disclaimer, the term of this patent is extended or adjusted under 35 U.S.C. 154(b) by 0 days.

(21) Appl. No.: 16/478,032

(22) PCT Filed: Feb. 15, 2018

(86) PCT No.: PCT/DE2018/100139
§ 371 (c)(1),
(2) Date: Jul. 15, 2019

(87) PCT Pub. No.: WO2018/192607
PCT Pub. Date: Oct. 25, 2018

(65) Prior Publication Data
US 2019/0372316 A1    Dec. 5, 2019

(30) Foreign Application Priority Data

Apr. 21, 2017    (DE) .................... 10 2017 108 523

(51) Int. Cl.
*H02B 1/30* (2006.01)
*H02B 1/01* (2006.01)
*H02B 1/32* (2006.01)

(52) U.S. Cl.
CPC ............. *H02B 1/301* (2013.01); *H02B 1/013* (2013.01); *H02B 1/32* (2013.01)

(58) Field of Classification Search
CPC ...... F16M 13/022; H02B 1/012; H02B 1/013; H02B 1/301; H02B 1/303; H02B 1/32;
(Continued)

(56) References Cited

U.S. PATENT DOCUMENTS 5,333,950 A    8/1994    Zachrai
6,155,660 A    12/2000   Nicolai
(Continued)

FOREIGN PATENT DOCUMENTS

DE    4140072 A1    6/1993
DE    19737488 C1   5/1999
(Continued)

OTHER PUBLICATIONS

International Search Report (in English and German) and Written Opinion (in German) issued in PCT/DE2018/100139, dated May 9, 2018; ISA/EP.

(Continued)

*Primary Examiner* — Mandeep S Buttar
(74) *Attorney, Agent, or Firm* — Harness, Dickey & Pierce, P.L.C.

(57) ABSTRACT

The invention relates to a mounting plate arrangement having a mounting plate which is fixed to a frame of a switch cabinet via at least one mounting plate holder, the mounting plate holder having a bearing piece which bears against or is fixed to a lower longitudinal edge of the mounting plate, the mounting plate with the bearing piece resting on a horizontal strut of the frame via a mounting bracket of the mounting plate holder, wherein at least a contact side of the bearing piece, via which the bearing piece rests on the mounting bracket, is or comprises a damping element.

13 Claims, 7 Drawing Sheets

(58) Field of Classification Search
CPC ...... H02B 1/54; H05K 5/0008; H05K 5/0204; H05K 5/0221
USPC ....... 361/631, 730, 809; 248/220.21, 220.41, 248/241; 174/57, 535
See application file for complete search history.

(56) References Cited

U.S. PATENT DOCUMENTS

| | | |
|---|---|---|
| 9,871,353 B2 | 1/2018 | Boehme et al. |
| 10,277,014 B2 | 4/2019 | Brueck et al. |
| 2016/0352080 A1 | 12/2016 | Brueck et al. |
| 2016/0352082 A1 | 12/2016 | Boehme et al. |
| 2018/0375302 A1 | 12/2018 | Reuter et al. |
| 2019/0130680 A1 | 5/2019 | Holighaus |

FOREIGN PATENT DOCUMENTS

| | | | |
|---|---|---|---|
| DE | 102015121192 A1 | 6/2017 | |
| FR | 2681478 A1 * | 3/1993 | ............. H02B 1/305 |
| WO | WO-9628004 A1 | 9/1996 | |
| WO | WO-9630978 A1 | 10/1996 | |

OTHER PUBLICATIONS

U.S. Appl. No. 16/328,304, filed Feb. 26, 2019, Schindler et al.

* cited by examiner

MOUNTING PLATE ASSEMBLY FOR A SWITCHGEAR CABINET

CROSS-REFERENCE TO RELATED APPLICATIONS

This application is a 371 U.S. National Stage of International Application No. PCT/DE2018/100139, filed on Feb. 15, 2018, which claims priority to German Application No. 10 2017 108 523.8, filed on Apr. 21, 2017. The entire disclosures of the above applications are incorporated herein by reference.

BACKGROUND

This section provides background information related to the present disclosure which is not necessarily prior art.

TECHNICAL FIELD

The invention relates to a mounting plate arrangement having a mounting plate which is fixed to a frame of a switch cabinet via at least one mounting plate holder, the mounting plate holder having a bearing piece which bears against or is fixed to a lower longitudinal edge of the mounting plate, the mounting plate with the bearing piece resting on a horizontal strut of the frame and/or an additional frame via a mounting bracket of the mounting plate holder. Such a mounting plate arrangement is known from WO 96/30978 A1.

DISCUSSION

Depending on the number of components fitted to the mounting plate, it can weigh several hundred kilograms, whereby this load must be taken up by the mounting plate holders when the mounting plate is mounted inside the switch cabinet. Thus, the mounting plate holders are exposed to correspondingly high loads, especially if the switch cabinet does not stand completely still, for example when the switch cabinet is moved, perhaps because it is located on a seagoing vessel. The mounting plate holders known from the state of the art are therefore designed as solid steel components and are thus expensive to manufacture or complicated to handle.

SUMMARY

This section provides a general summary of the disclosure, and is not a comprehensive disclosure of its full scope or all of its features.

The invention therefore aims to further develop a mounting plate arrangement of the type described above in such a way that on the one hand, it can withstand high loads and on the other hand, is both cost-effective to manufacture and easy to handle.

Accordingly, at least a contact side of the bearing piece via which the bearing piece rests on the mounting bracket is a damping element, or the contact side comprises such a damping element.

Tests have shown that instead of a solid and rigid steel mounting plate holder, a two-piece mounting plate holder with a mounting bracket and a bearing piece can be suitable to compensate for vibration loads of the holder. In order to simplify assembly, it is conceivable that the bearing piece can be pre-assembled on the mounting plate so that the mounting plate can be placed on the mounting bracket via the bearing piece. If the bearing piece has a damping element at its contact side via which the bearing piece rests on the mounting bracket, the damping element is capable of absorbing vibrations which cause torsion and wear in the case of rigid mounting plate holders, thereby increasing the stability of the mounting plate arrangement.

In order to increase the mechanical coupling between the contact side and the mounting plate and thus improve the damping effect of the damping element, the bearing piece may have a receptacle in which the lower longitudinal edge of the mounting plate is accommodated.

In order to further simplify pre-assembly of the mounting plate with respect to the mounting bracket, the bearing piece can have a pin that extends into a pin receptacle of the mounting bracket. The pin may be floating in the pin receptacle. The pin receptacle may have a taper to facilitate insertion of the pin into the pin receptacle as the mounting plate is pivoted into the vertical from an angled position relative to the vertical. At its free end, the pin can be tapered to further facilitate the insertion of the pin into the pin receptacle.

The damping element of the bearing piece may comprise or consist of a material having a modulus of elasticity which is less than a modulus of elasticity of the material of the frame and less than a modulus of elasticity of the material of the mounting bracket. For example, the damping element of the bearing piece can consist of plastic and the mounting bracket can be a metal part, especially a steel part. The mounting bracket can be, for example, a folded steel part. The bearing piece including the damping element can be a plastic injection moulded part. Frames are usually made of folded steel. The bearing piece, or at least the damping element, can comprise or consist of a thermoplastic material, e.g. polyamide.

The damping element may comprise a support wall extending parallel to a counter support wall of the mounting bracket and perpendicular to the contact side. The receptacle can be open towards the counter support wall of the mounting bracket so that when the mounting plate is mounted on the mounting plate holder, the receptacle is closed by the counter support wall on the side facing the counter support wall of the mounting bracket.

While the counter support wall as part of the mounting bracket may also be made of steel, the support wall of the damping element may be made of a more elastic material, such as plastic, so that the support wall of the damping element in the direction perpendicular to the support wall and the counter support wall is designed to absorb vibrations and thus relieve the mounting plate holder. The support wall may be made of the same material as the contact side, in particular both may be integrally formed.

An edging, in particular a C-edging or an U-edging, on the outer perimeter of the mounting plate can be held between the support wall and the counter support wall, wherein the mounting plate bears with its mounting plane for interior components against a first of support wall and counter support wall. The mounting plate can bear with a profile side of the edging against a second of support wall and counter support wall, the profile side being arranged parallel spaced apart from the mounting plane. The support wall and the counter support wall can thus form a form-fit receptacle for the edging of the mounting plate. Since the support wall can be part of the damping element, the support wall is designed to absorb vibrations in the direction perpendicular to the support wall and the counter support wall, thus relieving the mounting plate holder.

The mounting plate can be fixed, in particular screwed, to the counter support wall of the mounting bracket via the edging, in particular via a profile side of the edging arranged parallel spaced apart from the mounting plane of the mounting plate. For this purpose, the counter support wall may have an opening, for example a bolt aperture and/or a receptacle for a cage nut. Flush therewith, the profile side of the edging can have a further opening through which a bolt is guided between the profile side and the counter support wall. In order to allow the insertion of a fastener, such as a bolt, through the flush openings in the profile side and the counter support wall of the mounting bracket from the front of the mounting plate, i.e. across the mounting plane of the mounting plate, the mounting plate may have another opening through its mounting plane which is flush with the aforementioned openings through the profile side and the counter support wall of the mounting bracket.

The frame may have a rectangular floor frame comprising two width struts and two depth struts extending perpendicularly thereto, the floor frame being placed on an additional frame which provides a horizontal support side on the inner perimeter of the floor frame, and the mounting bracket having a foot portion with which the mounting bracket rests on the support side. Such a frame with additional frame is described in DE 10 2015 121 192 A1.

The foot portion may have a support section via which the mounting bracket is supported onto a vertical profile side on the inner perimeter of the floor frame.

The mounting bracket may have a mounting section with which the mounting bracket engages across a horizontal fastening side of the frame. A suitable frame is also described in DE 10 2015 121 192 A1. The mounting bracket can be fixed to the frame via the mounting section, in particular screwed.

The mounting section may have a hook via which the mounting bracket engages in a fastening receptacle of a system perforation provided in a horizontal fastening side of a horizontal floor frame of the frame.

The mounting bracket may comprise a first and a second pin receptacle, a pin of the bearing piece being received in the first pin receptacle when the mounting bracket is mounted on a depth strut of a horizontal floor frame of the frame, and the pin of the bearing piece being received in the second pin receptacle when the mounting bracket is mounted on a width strut of a floor frame of the frame. For this purpose, the width struts and the depth struts of the floor frame can be designed particularly as identical profiles in cross-section perpendicular to the longitudinal direction.

A horizontal and/or a vertical fastening side of a depth strut of the frame may have a system perforation of fastening receptacles arranged under a fixed grid dimension, wherein a vertical mounting plane of the mounting plate is arranged in the grid dimension.

In particular, an edging of the mounting plate can be designed as a C-edging or an U-edging. The edging can comprise a row of system perforations on a side perpendicular to the mounting plane of the mounting plate, the fastening receptacles being arranged under a fixed grid dimension. The grid dimension of the fastening receptacles of the C-edging can correspond to the grid dimension in a vertical profile of the frame of the switch cabinet. The mounting plate holder can be set up to align the grid dimension of the C-edging with the grid dimension of the vertical profile of the frame of the switch cabinet. At least one interior component can be positioned between the edging of the mounting plate and the vertical strut, whereby the interior component is connected to the edging via the system perforation of the edging and to the vertical profile via the system perforation of the vertical profile.

DRAWINGS

The drawings described herein are for illustrative purposes only of selected embodiments and not all possible implementations, and are not intended to limit the scope of the present disclosure.

The invention is explained in more detail using the figures below, as shown in.

DETAILED DESCRIPTION

Example embodiments will now be described more fully with reference to the accompanying drawings.

Figure 1:
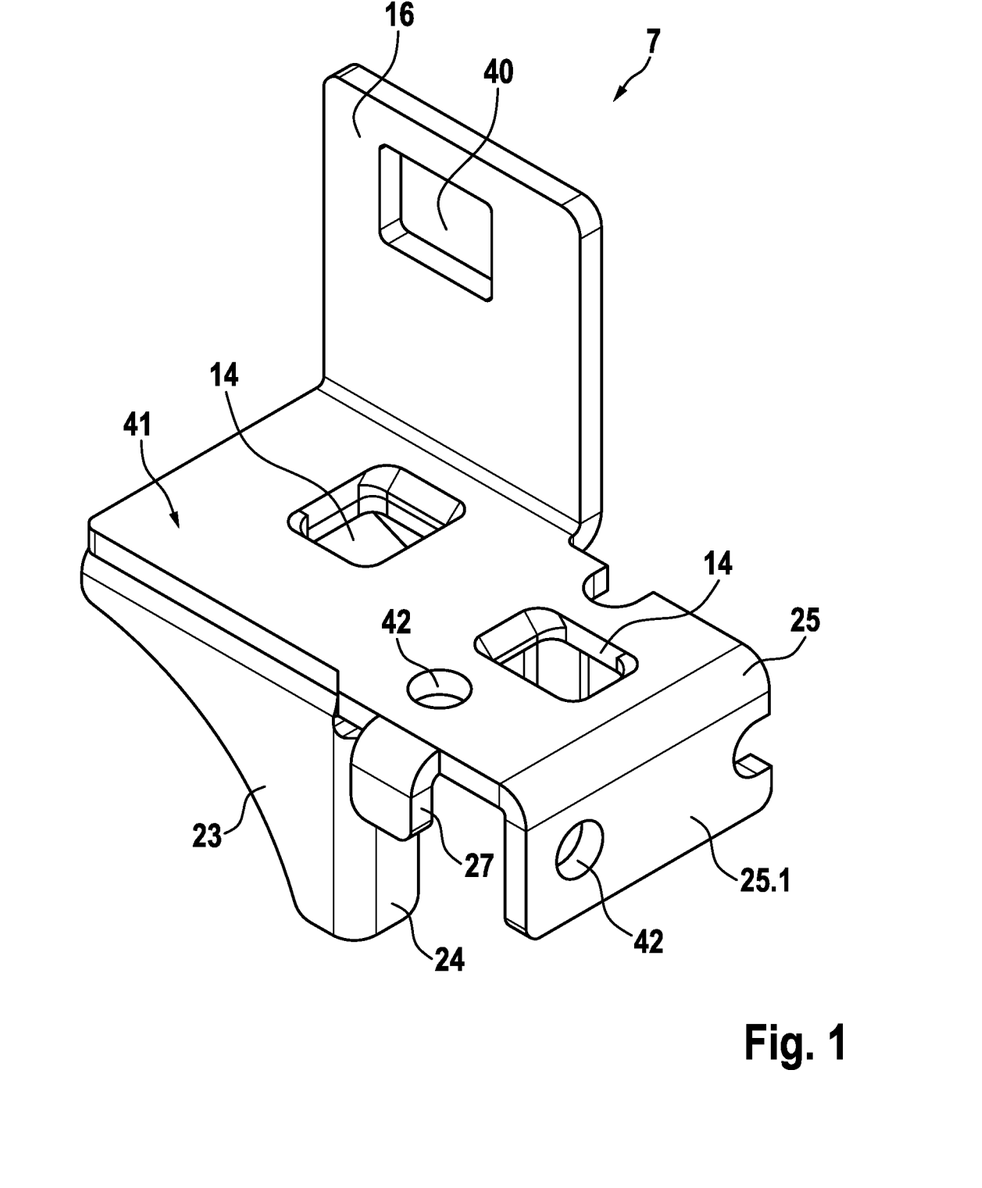
FIG. 1 an exemplary embodiment of a mounting bracket in a perspective view.

FIG. 1 shows an exemplary embodiment of a mounting bracket 7, which is formed as a sheet metal part. In particular, the sheet metal part can be formed in two parts, with a lower foot portion 23 and an upper part placed thereon, which consists essentially of the contact side 41, the counter support wall 16 that is bent therefrom and the mounting section 25 formed thereon. As can be seen, the two components of the mounting bracket 7 are essentially obtained by punching and edging and can be welded together.

The counter support wall 16, which is bent off from the contact side 41, has a receptacle 40 for a cage nut or the like, via which the mounting plate (not shown) can be screwed with the mounting bracket 7. The mounting section 25 can be formed in such a way that when the mounting bracket 7 is placed on a horizontal profile of a floor frame of a frame of a switch cabinet, such as shown for example in DE 10 2015 121 192 A1, the mounting section 25 engages across an upper horizontal mounting section of the frame, so that the mounting section 25 with its vertical section 25.1 engages behind the horizontal fastening side 26 of the frame (see FIGS. 4 and 6) and bears there against a first vertical profile side of the profile frame, while the foot portion 23 with its support section 24 is supported against another vertical profile side of the profile frame. The two vertical profile sides of the frame can be connected to facing longitudinal edges of the horizontal fastening side 26 of the frame at an angle of 90°, i.e. folded from the horizontal fastening side 26. At the same time, the hook 27 can engage in a system perforation 28 in the horizontal fastening side 26 of the profile frame (see FIG. 6).

The mounting bracket 7 has a first and a second pin receptacle 14, each with a taper to facilitate the insertion of a pin 13 (see FIG. 4) during a pivoting movement of the mounting plate. The pin 13 of the bearing piece 5 can be accommodated in a first pin receptacle 14 if the mounting bracket 7 is mounted on a depth strut of a horizontal floor frame of the frame. Furthermore, the pin of the bearing piece can be accommodated in the second pin receptacle 14 if the mounting bracket is mounted, for example, on a width strut of a floor frame of the frame. Mounting section 25 also has bolt apertures 42 to screw the mounting bracket 7 to the floor frame of a frame.

Figure 2:
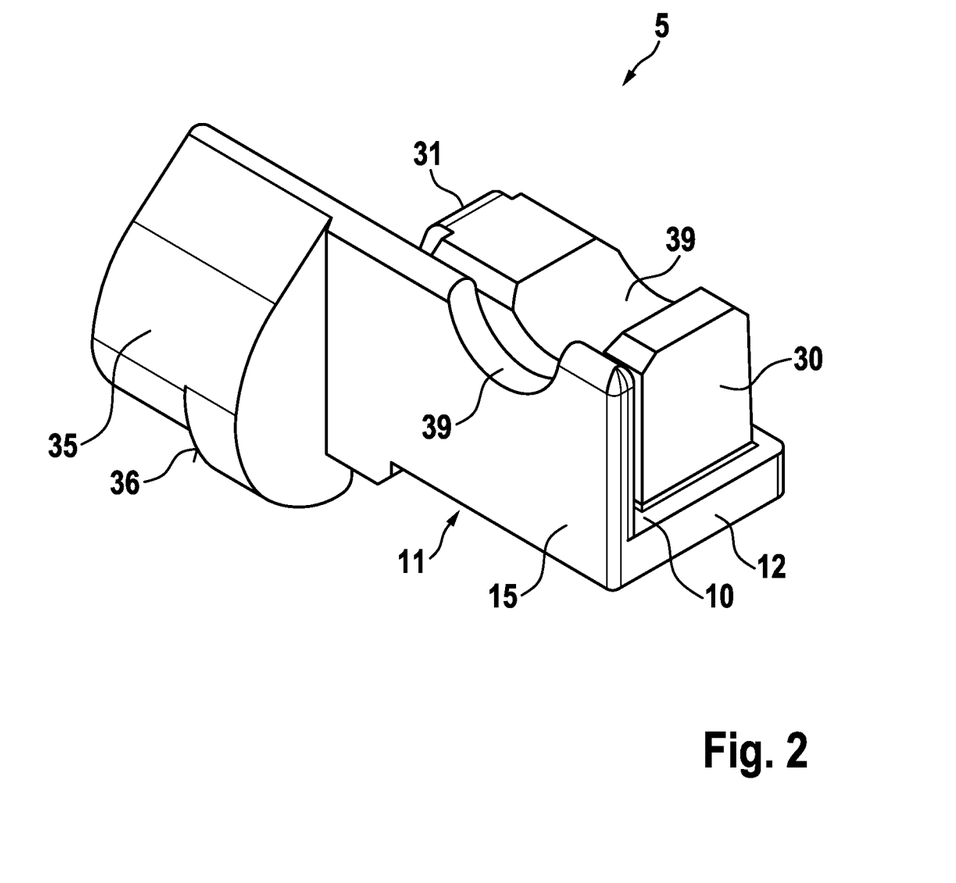
FIG. 2 an exemplary embodiment of a bearing piece in a perspective view.
Figure 3:
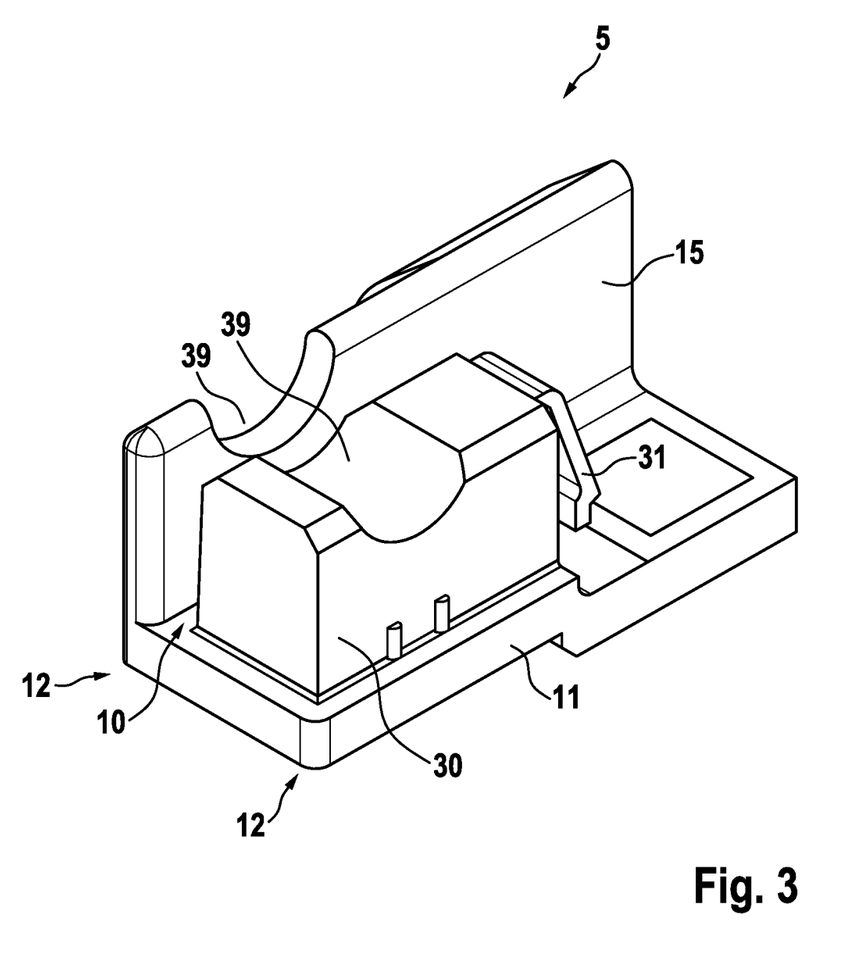
FIG. 3 another perspective view of the bearing piece according to FIG. 2.

FIGS. 2 and 3 show an exemplary embodiment of a bearing piece 5. For example, the bearing piece 5 may be a plastic part and thus have a lower modulus of elasticity than the mounting bracket 7 shown in FIG. 1, so that when the bearing piece 5 is placed on the mounting bracket 7 as shown in FIG. 1, it is capable of absorbing vibrations and thus reducing the mechanical stress on the mounting plate holder composed of the components shown in FIGS. 1 and 2. In particular, the bearing piece 5 shown in FIGS. 2 and 3 may be an injection-molded part. The bearing piece 5 consists of a thermoplastic material, e.g. polyamide.

The bearing piece 5 has a contact side 11 via which the bearing piece 5 rests on the mounting bracket 7 (see FIG. 1). Looking at FIGS. 2 to 4 in combination, it can be seen that a pin 13 can be arranged on an underside of the contact side 11, via which pin the bearing piece 5 can engage in one of the pin receptacles 14 of the mounting bracket 7. In particular, the bearing piece 5 can damp vertical vibrations of the mounting plate via its contact side 11, since at least the contact side 11 of the bearing piece 5 can consist of a material which has a modulus of elasticity which is lower than the modulus of elasticity of the material of the mounting bracket 7 (see FIG. 1). In order to absorb vibrations perpendicular thereto, i.e. vibrations perpendicular to the support wall 15, the support wall 15 is also made of a material, for example the same plastic as the contact side 11, which has a modulus of elasticity lower than a modulus of elasticity of the material of the mounting bracket 7. Thus, in the embodiment shown in FIGS. 2 and 3, the supporting wall 15 and the contact side 11 form the damping element 12.

Figure 4:
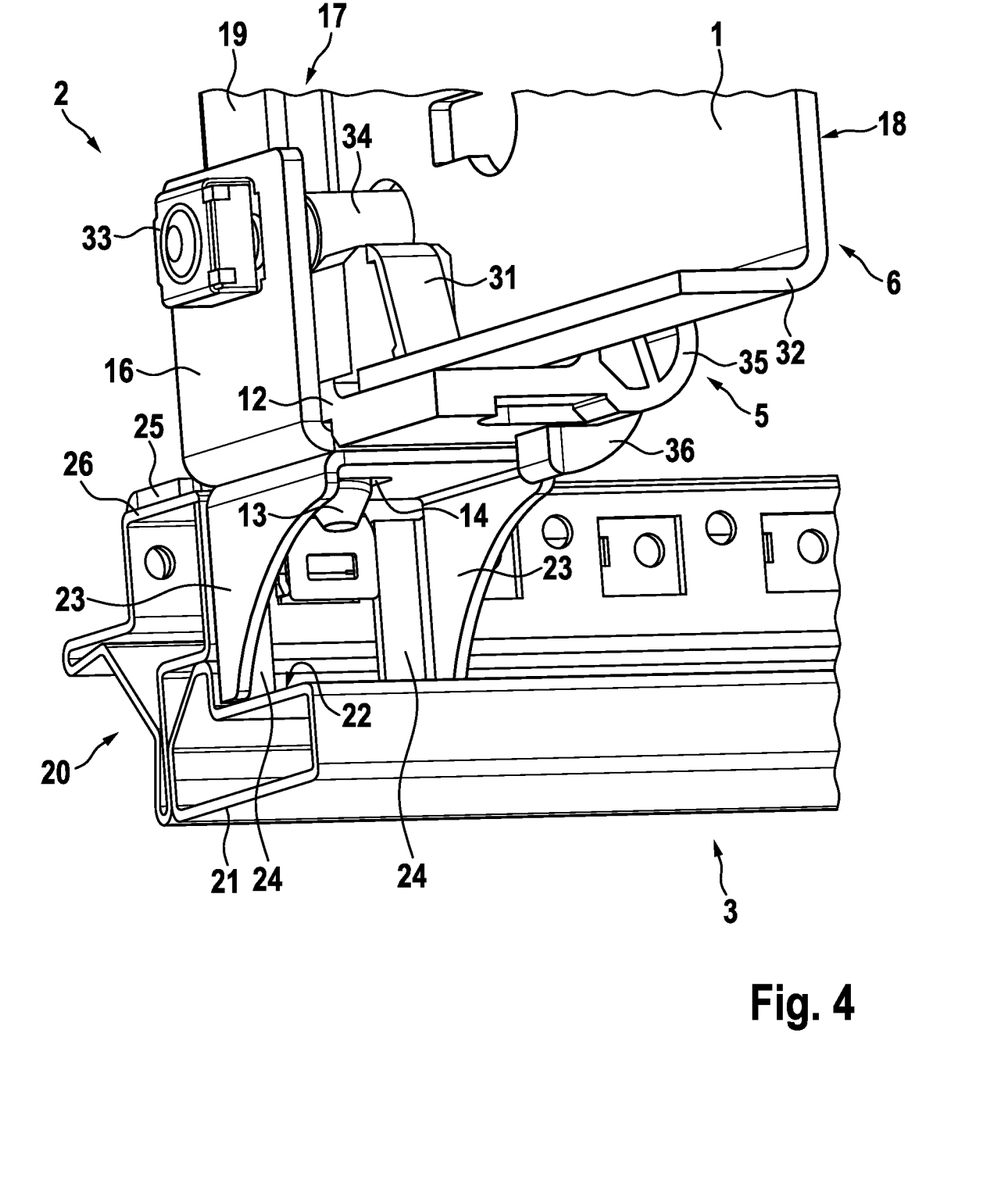
FIG. 4 an exemplary mounting plate arrangement according to an embodiment of the invention.
Figure 5:
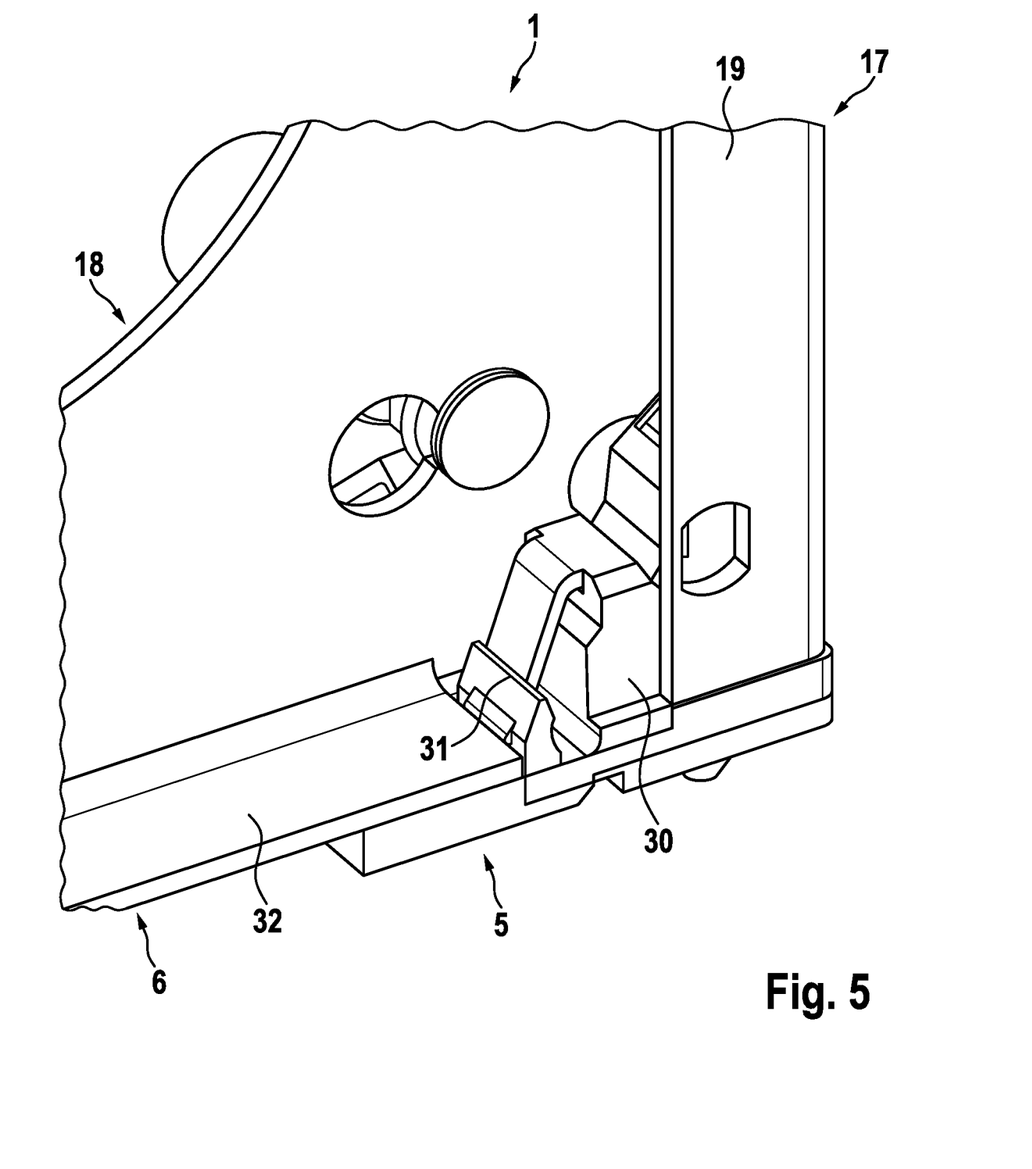
FIG. 5 an embodiment of a sliding piece connected to a mounting plate via the lower longitudinal edge of the mounting plate.

The bearing piece 5 has a fitting piece 30, via which the bearing piece 5 can be inserted via a lower longitudinal edge 6 of a mounting plate 1 (see FIG. 5) in a recess on the lower longitudinal edge 6 of the mounting plate 1 and connected to the mounting plate. For this purpose the fitting piece 30 has a latch 31 which, as shown in FIGS. 4 and 5, engages behind an L-edge 32 on the lower longitudinal edge 6 of the mounting plate 1 when the bearing piece 5 is inserted into the mounting plate via the fitting piece. In particular, fitting piece 30 is designed to be inserted form-fittingly over the lower longitudinal edge 6 of mounting plate 1 into mounting plate 1 in the area of a C- or U-edging of mounting plate 1 and thus to fix bearing piece 5 in relation to mounting plate 1. The fitting piece 30 and the support wall 15 each have a recess 39 at their free ends, which form a bolt aperture, as is clearly shown in combination with FIGS. 4 and 6.

In the mounting plate arrangement shown in FIG. 4, the mounting plate 1 is fixed via the mounting plate holder 2 to a floor assembly consisting of a floor frame 20 and an additional frame 21 such as described in DE 10 2015 121 192 A1. The geometric details of the floor assembly are therefore not discussed further hereafter. With regard to this invention, the floor assembly is characterized in particular in that the additional frame 21 provides a horizontal support side 22 via the inner perimeter of the floor frame 20, on which the mounting bracket 7 rests via its foot portion 23 and hence the mounting plate holder 2 absorbs the vertical loads. Horizontal forces are absorbed by mounting section 25, which grips or engages behind a horizontal fastening side 26 of the floor frame 20.

Figure 6:
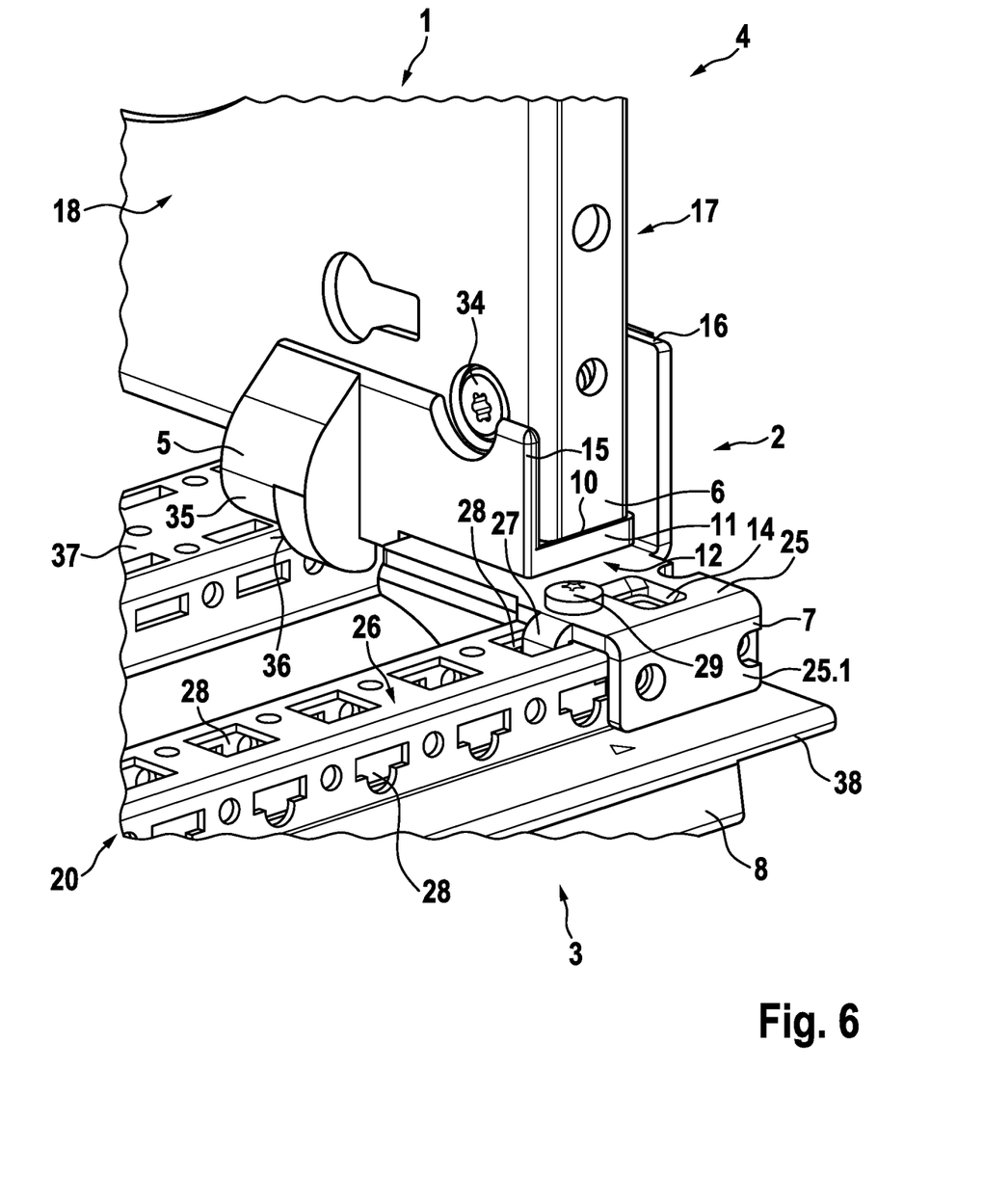
FIG. 6 another embodiment of an exemplary mounting plate arrangement.

For example, the mounting bracket 7 of the embodiment according to FIG. 4 may be designed according to the embodiment of FIG. 1. As shown in FIG. 6, the mounting bracket 7 can be screwed to the fastening side 26 of the floor frame 20 via a bolt 29. The counter support wall 16 has in its outer side facing away from the mounting plate 1 a cage nut 33, into which a bolt 34 is screwed via the mounting plane 18 of the mounting plate 1 and through the parallel spaced further profile side 19 of the C-edging 17 of the mounting plate 1 and through the counter support wall 16. The bearing piece 5 is placed on the mounting bracket 7 via its damping element 12.

Looking at FIGS. 4 and 6 in combination, it can be seen that the bearing piece 5 with mounting plate 1 and with the mounting bracket 7 can be moved from an angled position into the vertical and that the pin 13 (see FIG. 4) on the underside of the contact side 11 of the bearing piece 5 can be inserted into the pin receptacle 14 of the mounting bracket 7 (see FIG. 1). In order to guide the displacement of the inclined mounting plate along the slide rail 37, the bearing piece 5, in particular the contour 35 of the bearing piece 5, has a shoulder which has a guide surface 36 which is guided on a vertical outer edge of the slide rail 37.

As shown in FIG. 6, the edging 17 of the mounting plate 1 is accommodated in the mounting position between the counter support wall 16 of the mounting bracket 7 and the support wall 15 of the bearing piece 5, whereby the mounting plate 1 is screwed via a bolt 34 through the mounting plane 18 and via the profile side 19 to the counter support wall 16 (see also FIG. 4). In the mounting position shown in FIG. 6, the mounting plate 1 is damped against shocks and vibrations in the vertical direction by means of the contact side 11, which can consist of a plastic material, via the mounting bracket 7 and thus against the floor frame 20; the mounting plate 1 is damped against vibrations in the horizontal plane by means of the supporting wall 15, which can be made of a material with a lower modulus of elasticity than the material of the mounting bracket 7, just like the contact side 11. Thus, the supporting wall 15 and the contact side 11 form the damping element 12 in the sense of the present invention for the embodiment shown in FIG. 6. It could be shown that mounting plate holders with a damping element are considerably less susceptible to wear and withstand high vibration loads.

FIG. 5 shows a detailed view of a mounting plate 1 in the area of edging 17, which is designed as a C-edging or an U-edging, respectively, and which forms a vertical edge of the mounting plate 1. On the lower, horizontal longitudinal edge 6, the mounting plate 1 comprises an L-edging 32. The L-edging 32 has a cutout in the edge area, i.e. in the area of the C- or U-edge 17, so that a receptacle is formed for fitting piece 30 of bearing piece 5. In the inserted position of the bearing piece 5 shown in FIG. 5, a latch 31 engages behind the L-edging and thus fixes the bearing piece 5 to the mounting plate 1.

Figure 7:
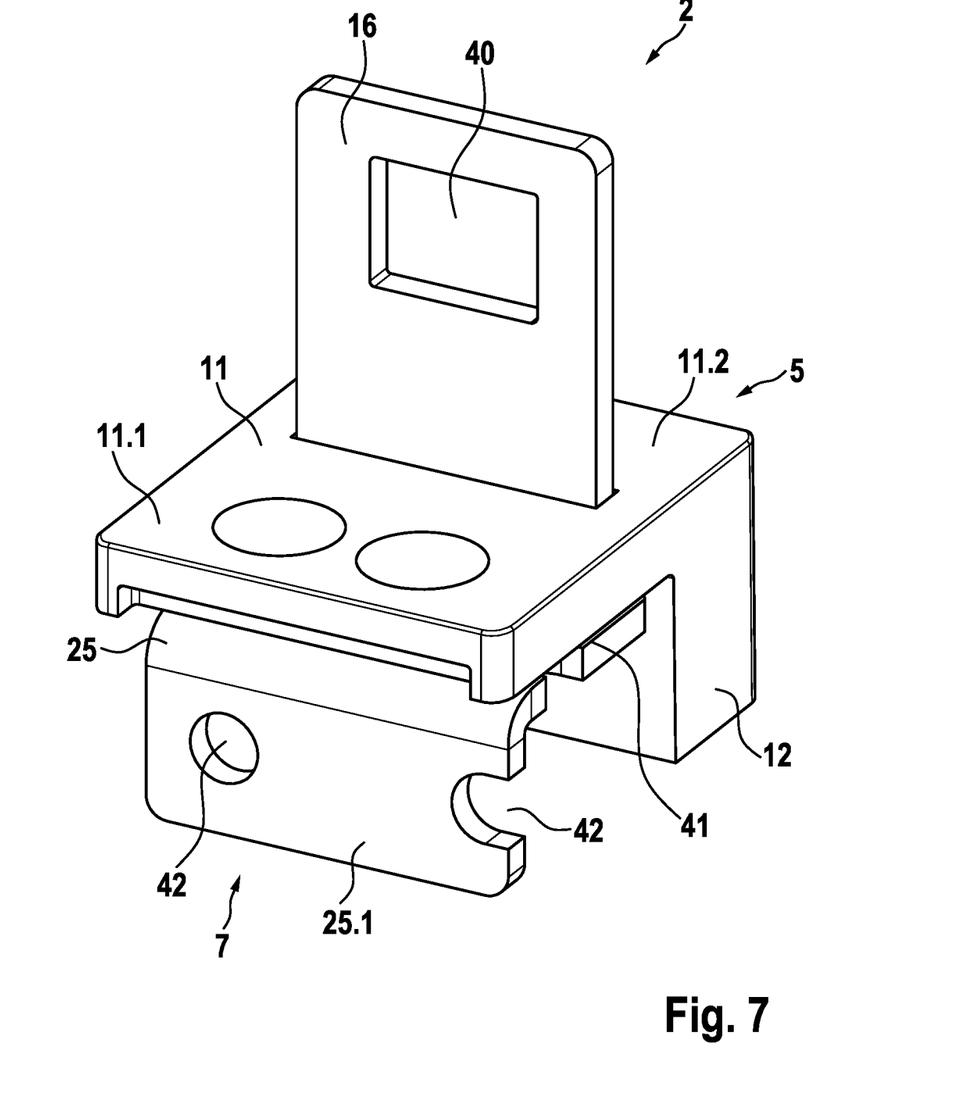
FIG. 7 another embodiment of a mounting plate holder.

FIG. 7 shows a further embodiment of a mounting plate holder 2, which consists of a mounting bracket 7 and a bearing piece 5, wherein the bearing piece 5 has an aperture extending perpendicularly through the contact side 11 of the bearing piece 5, through which aperture the mounting bracket 7 projects with its counter support wall 16. The mounting bracket 7 with its further contact side 41 bears against the underside of the contact side 11 of the bearing piece 5. The mounting bracket 7 has a vertical section 25.1. which extends perpendicularly to the further contact side and with which the mounting plate holder 2 can engage behind a profile side of a frame analogous to the mounting bracket 7 shown in FIG. 1 to fix a mounting plate to the frame using the mounting plate holder 2.

Bearing piece 5 is essentially formed as a damping element 12, which can, for example, be made of a thermoplastic material, in particular a polyamide. The contact side 11 of the damping element 12 is divided into two parts and has a first section 11.1 which extends perpendicularly to a front side of the counter support wall 16 and a second section 11.2 which extends perpendicularly to a rear side of the counter support wall 16 opposite the front side.

In a first mounting position, a mounting plate can be fixed to the front of the support wall 16 with its profile side 19 (see FIG. 5) and can rest on the first section 11.1 of the contact side 11 for this purpose. In a second mounting position, a mounting plate may be in contact with the rear side of the counter support wall 16 with its mounting plane and can rest on the second section 11.2 of the contact side 11. The mounting plate holder shown in FIG. 7 is therefore suitable for fixing the mounting plate in two different mounting positions relative to the frame. In particular, the mounting plate holder 2 shown in FIG. 7 allows the mounting plate with the mounting plate holder 2 pre-assembled on the lower edge of the mounting plate to be placed and pivoted into the frame from an outside, in particular from the rear of the switch cabinet. Analogous to the embodiments described above, the counter support wall 16 has a receptacle 40 for a cage nut or plug-in nut.

The features of the invention disclosed in the above description, in the drawings and in the claims may be essential for the realization of the invention, either individually or in any combination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. Switch cabinet comprising a frame and a mounting plate arrangement having a mounting plate which is fixed to the frame of the switch cabinet via at least one mounting plate holder, the mounting plate holder having a bearing piece which bears against or is fixed to a lower longitudinal edge of the mounting plate, the mounting plate with the bearing piece resting on a horizontal strut of the frame via a mounting bracket of the mounting plate holder, wherein at least a contact side of the bearing piece, via which the bearing piece rests on the mounting bracket, is or comprises a damping element, wherein the damping element comprises a support wall extending parallel to a counter support wall of the mounting bracket and perpendicular to the contact side, wherein a C-edging or an U-edging on the outer perimeter of the mounting plate is held between the support wall and the counter support wall, wherein the mounting plate bears with its mounting plane for interior components against the support wall or the counter support wall, and wherein the mounting plate bears with a profile side arranged parallel spaced apart from the mounting plane against the support wall or the counter support wall that does not bear against the mounting plane.

2. The switch cabinet according to claim 1, in which the bearing piece has a receptacle in which the lower longitudinal edge of the mounting plate is accommodated.

3. The switch cabinet according to claim 1, in which the bearing member has a pin extending into a pin receptacle of the mounting bracket.

4. The switch cabinet according to claim 1, in which the damping element of the bearing piece comprises or consists of a material having a modulus of elasticity which is less than a modulus of elasticity of the material of the frame and less than a modulus of elasticity of the material of the mounting bracket.

5. The switch cabinet according to claim 1, in which the damping element of the bearing piece consists of plastic and the mounting bracket is a metal part.

6. The switch cabinet according to claim 1, in which the mounting plate is fixed, in particular screwed, to the counter support wall of the mounting bracket via the edging, in particular via a profile side of the edging arranged parallel spaced apart from the mounting plane of the mounting plate.

7. The switch cabinet according to claim 1, in which the frame has a rectangular floor frame comprising two width struts and two depth struts extending perpendicularly thereto, the floor frame being placed on an additional frame which provides a horizontal support side on the inner perimeter of the floor frame, and the mounting bracket having a foot portion with which the mounting bracket rests on the support side.

8. The switch cabinet according to claim 7, in which the foot portion has a support section via which the mounting bracket is supported onto a vertical profile side on the inner perimeter of the floor frame.

9. The switch cabinet according to claim 1, in which the mounting bracket has a mounting section with which the mounting bracket engages across a horizontal fastening side of the frame.

10. The switch cabinet according to claim 9, in which the mounting bracket is fixed, in particular screwed, to the frame via the mounting section.

11. The switch cabinet according to claim 9, in which the mounting section has a hook via which the mounting bracket engages in a fastening receptacle of a system perforation in a horizontal fastening side of a horizontal floor frame of the frame.

12. The switch cabinet according to claim 1, in which the mounting bracket comprises a first and a second pin receptacle, a pin of the bearing piece being received in the first pin receptacle, when the mounting bracket is mounted on a depth strut of a horizontal floor frame of the frame, and wherein the pin of the bearing piece is received in the second pin receptacle when the mounting bracket is mounted on a width strut of a floor frame of said frame.

13. The switch cabinet according to claim 1, in which a horizontal and/or a vertical fastening side of a depth strut of the frame has a system perforation of fastening receptacles arranged under a fixed grid dimension, a vertical mounting plane of the mounting plate being arranged in the grid dimension.

* * * * *